(12) United States Patent
Amaya et al.

(10) Patent No.: US 11,465,358 B2
(45) Date of Patent: Oct. 11, 2022

(54) THREE-DIMENSIONAL OBJECT SHAPING METHOD

(71) Applicant: Matsuura Machinery Corporation, Fukui (JP)

(72) Inventors: Kouichi Amaya, Fukui (JP); Kousuke Ishimoto, Fukui (JP)

(73) Assignee: Matsuura Machinery Corporation, Fukui (JP)

( * ) Notice: Subject to any disclaimer, the term of this patent is extended or adjusted under 35 U.S.C. 154(b) by 956 days.

(21) Appl. No.: 15/667,311

(22) Filed: Aug. 2, 2017

(65) Prior Publication Data
US 2019/0039315 A1 Feb. 7, 2019

(51) Int. Cl.
| | |
|---|---|
| *B29C 64/30* | (2017.01) |
| *B29C 64/393* | (2017.01) |
| *B29C 64/153* | (2017.01) |
| *B29C 64/214* | (2017.01) |
| *B28B 1/00* | (2006.01) |
| *B33Y 10/00* | (2015.01) |
| *B33Y 30/00* | (2015.01) |
| *B33Y 50/02* | (2015.01) |
| *B22F 10/20* | (2021.01) |
| *B28B 17/00* | (2006.01) |
| *B22F 10/30* | (2021.01) |

(52) U.S. Cl.
CPC ............ *B29C 64/393* (2017.08); *B22F 10/20* (2021.01); *B28B 1/001* (2013.01); *B29C 64/153* (2017.08); *B29C 64/214* (2017.08); *B33Y 10/00* (2014.12); *B33Y 30/00* (2014.12); *B33Y 50/02* (2014.12); *B22F 10/30* (2021.01); *B28B 17/0081* (2013.01)

(58) Field of Classification Search
CPC ......... B33Y 10/00; B33Y 30/00; B33Y 50/02; B29C 64/214; B29C 64/153; B22F 3/1055; B28B 1/001; B23K 26/345; B32B 37/24
See application file for complete search history.

(56) References Cited

U.S. PATENT DOCUMENTS

| | | | | |
|---|---|---|---|---|
| 9,254,535 | B2 * | 2/2016 | Buller | B23K 26/346 |
| 2005/0263934 | A1 * | 12/2005 | Chung | B29C 64/153 |
| | | | | 264/113 |
| 2011/0109016 | A1 * | 5/2011 | Fuwa | B22F 3/1055 |
| | | | | 264/460 |

(Continued)

FOREIGN PATENT DOCUMENTS

| | | | | |
|---|---|---|---|---|
| DE | 102009035258 A1 * | 2/2011 | ........... | B29C 64/153 |
| JP | 5777187 B1 | 7/2005 | | |

(Continued)

*Primary Examiner* — Matthew J Daniels
*Assistant Examiner* — Shibin Liang
(74) *Attorney, Agent, or Firm* — Richard M. Goldberg

(57) ABSTRACT

A three-dimensional object shaping method includes the steps of a powder layer forming step, a sliding step of a squeegee on the supplied powder, and a sintering step of irradiating the powder layer, all successively repeated, wherein after dividing shaping regions into a plurality of laminating units, each laminating unit of the plurality of laminating units is divided into an inside region including a maximum prearranged sintering region, and an outside region not including the maximum prearranged sintering region, and wherein the squeegee sliding speed in the outside region is set to be greater than the sliding speed in the inside region.

3 Claims, 2 Drawing Sheets

(56) References Cited

U.S. PATENT DOCUMENTS

2015/0343533 A1* 12/2015 Park .................. B28B 7/465
425/78

FOREIGN PATENT DOCUMENTS

| JP | 2005-335203 A | 12/2005 |
|---|---|---|
| JP | 2015-193184 A | 11/2015 |
| JP | 2015-199197 A | 11/2015 |
| WO | 2012/160811 A1 | 11/2012 |

* cited by examiner

[Fig. 1]
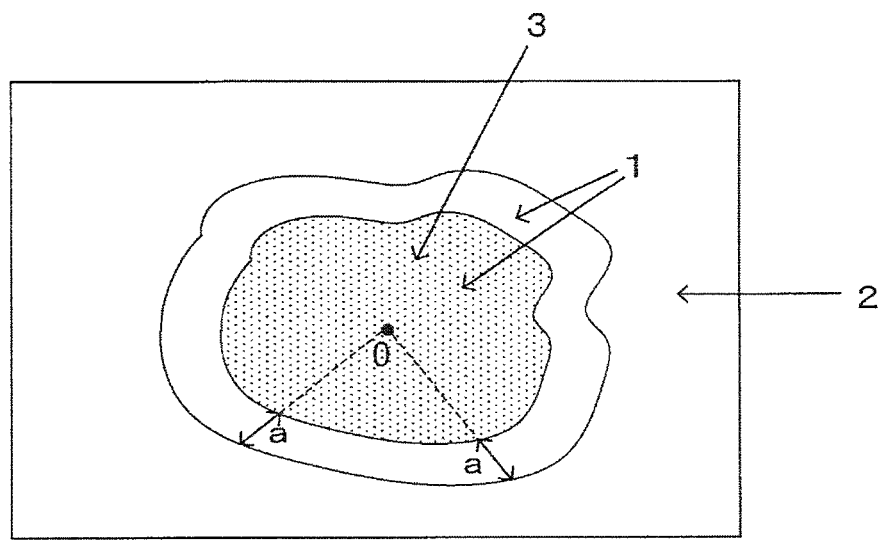
[Fig. 2]
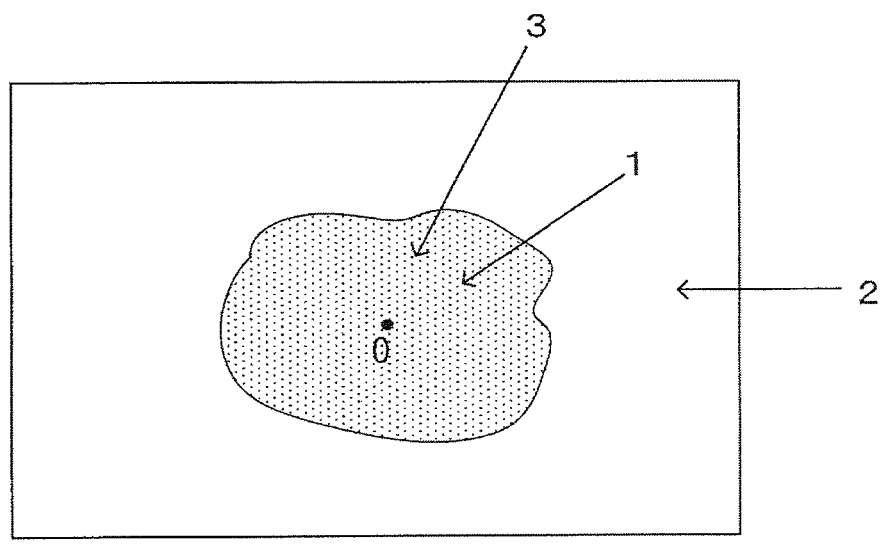

[Fig. 3]
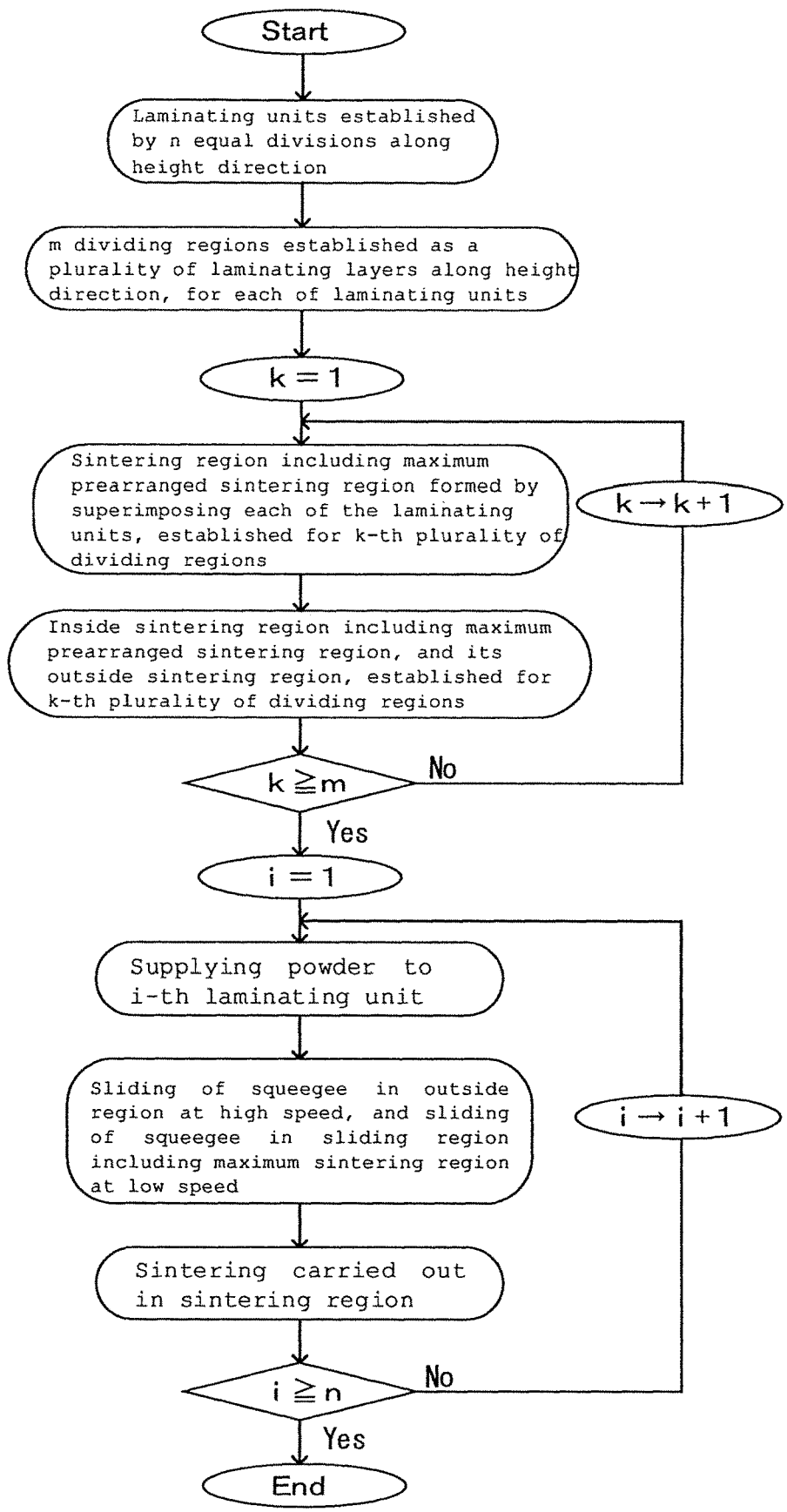

THREE-DIMENSIONAL OBJECT SHAPING METHOD

TECHNICAL FIELD

The present invention relates to a three-dimensional object shaping method carried out by laminating sintered layers by successive repeated formation of powder layers and formation of sintered layers by irradiation of a light beam or an electron beam.

BACKGROUND ART

In the step of forming the aforementioned powder layer, smoothing by sliding of a squeegee against the powder supplied into the shaping chamber, i.e. squeegeeing, is considered indispensable.

In the prior art, however, the squeegee sliding speed has been kept uniformly constant over all of the laminating regions along the height direction.

In fact, Patent Document 1 discloses sliding with a squeegee on a shaping table 10 for which powder is supplied by a powder supplying device 40 (FIG. 1 and paragraph [0031]), but this is without any particular variation of the sliding speed.

Similarly, Patent Document 2 also describes squeegee sliding as an indispensable step (Abstract), but nowhere mentions changing the squeegee sliding speed particularly.

In the prior art of such as Patent Documents 1 and 2, although the inside region including prearranged sintering region and the outside region not including them are set to a uniformly equal sliding speed, the outside region where sintering is not to be performed does not need to be set to the same level of sliding speed as the regions including the prearranged sintering regions.

Therefore, in the prior art, since the outside region that does not include the prearranged sintering region is set to an unnecessary low speed, the squeegeeing of the prior art has been extremely inefficient.

In order to overcome this inefficiency, an improved technique may be considered in which the regions where squeegee sliding is to be carried out are divided into a rectangular inside region that includes the prearranged sintering regions in a uniform manner along the entire height direction, and the region outside it, and the squeegee sliding speed in the outside region is set to be greater than the sliding speed in the inside region.

However, since the sintering regions usually vary sequentially in the height direction according to each laminating unit, in the improved technique described above as well, where the squeegee sliding speed is set to be lower in a wide rectangular inside region that does not correspond to the prearranged sintering regions, it is not possible to avoid the inefficiency of squeegee sliding being carried out in an inefficient manner.

PRIOR ART DOCUMENTS

Patent Documents

Patent Document 1: Japanese Published Unexamined Patent Application No. 2015-199197

Patent Document 2: Re-publication of PCT International Publication WO No. 2012-160811

SUMMARY OF INVENTION

Technical Problem

The problem to be solved by the present invention is to achieve efficiently forming powder layers by improving the squeegee sliding speed in a three-dimensional object shaping method.

Solution to Problem

In order to solve the aforementioned problem, a basic construction of the invention is:

a three-dimensional object shaping method comprising:

a powder layer forming step based on supply of a powder to a shaping chamber and smoothing that results from sliding of a squeegee on the supplied powder, and a sintering step of irradiating the powder layer with a light beam or electron beam and moving the position of irradiation, are successively repeated in that order to laminate sintered layers, wherein after dividing shaping regions into a plurality of laminating units along a height direction, a maximum prearranged sintering region, formed by superimposing all of the prearranged sintering regions in each laminating unit of the plurality of laminating units, is used as the basis, and each laminating unit of the plurality of laminating units is divided into an inside region including the maximum prearranged sintering region, and an outside region not including the maximum prearranged sintering region, and wherein the squeegee sliding speed in the outside region is set to be greater than the sliding speed in the inside region.

Advantageous Effects of Invention

In the basic construction described above, as a result of dividing the inside region including the maximum prearranged sintering region formed by superimposing the sintering regions in each laminating unit at each of the plurality of laminating units divided along the height direction, and the outside region not including the maximum prearranged sintering region, the inside region and outside region are successively varied depending on the height direction, and wide outside region is thereby established, whereby squeegee sliding can be carried out at the necessary low speed for achieving a precise flat shape in the inside region, while squeegee sliding can be carried out at a pretty high speed for rough flatness in the outside region.

As a result, it is possible to accomplish efficient squeegee sliding, in other words, squeegeeing.

BRIEF DESCRIPTION OF DRAWINGS

FIG. 1 is a plan view showing the features of Example 1 founded on the basic construction. Point 0 represents the center position of the sintering region or maximum sintering region.

FIG. 2 is a plan view showing the features of Example 2 founded on the basic construction. Point 0 represents the center position of the sintering region or maximum sintering region.

FIG. 3 is a flow chart showing the process for the basic construction.

DESCRIPTION OF EMBODIMENTS

As shown in the flow chart of FIG. 3, according to the basic construction, a plurality of laminating units are divided along the height direction beforehand according to a program, and the maximum prearranged sintering region, formed by superimposing all of the prearranged sintering regions 3 for each laminating unit of the plurality of laminating units based on the divisions, are used as the basis, and each laminating unit is divided into the inside region 1 including the maximum prearranged sintering region and the outside region 2 not including the maximum prearranged sintering region.

In each of the plurality of laminating units, after which supplying of powder, sliding with a squeegee and each sintering procedure are repeated in succession to accomplish the lamination necessary for three-dimensional shaping, and during this time the squeegee sliding speed in the outside region 2 is set to be greater than the speed in the inside region 1.

Thus, according to the basic construction, division into the inside region 1 and the outside region 2, and setting of the different speeds, allow the aforementioned effect of the invention to be exhibited.

The shape of the inside region 1 is not specified for the basic construction.

Consequently, rectangular shape may be adopted as in the prior art, or circular shape may be adopted.

Rectangular region is advantageous in that the range of sliding by reciprocation of the squeegee is uniform, and the division is made more simple.

Circular shape, on the other hand, is advantageous in that it can set inside region 1 more compact than it of rectangular shape, therefore allows the outside region 2 to be wider and moreover allows more efficient squeegeeing.

A description will be given as below according to Examples.

Example 1

In the case of Example 1, as shown in FIG. 1, each location on the border between the inside region 1 and the outside region 2 has a length of a prescribed distance "a" along a line connecting the center location of the maximum prearranged sintering region and each location on the outer periphery, with respect to the respective locations on the outer periphery of the maximum prearranged sintering region.

In the case of Example 1, the inside region 1 is set to have a longer distance than the sintering region 3 by a prescribed width "a" from the center location along the direction of each line beyond each location on the outer periphery, thereby allowing a more compact inside region 1 to be established compared to the aforementioned circular inside region 1, and allowing even more efficient squeegeeing to be accomplished.

Note that the distance that is longer by "a," as shown in FIG. 1, can be assessed by CAM, after previously setting the locations on the outer periphery of the sintering region 3 by CAD.

Example 2

In the case of Example 2, as shown in FIG. 2, the maximum prearranged sintering region 3 and the inside region 1 are equivalent in each of the plurality of laminating units.

Thus, in Example 2 where the sintering region or maximum sintering region 3 is equivalent to the inside region 1, all of the region outside the sintering region 3 corresponds to the outside region 2, thereby allowing squeegeeing to be accomplished even more efficiently than Example 1.

However, since the shape of an actual three-dimensional object must be cut from further outside than the sintering region 3, the maximum sintering region 3 of each of the plurality of laminating units that have been divided must be set to regions that are wider by a prescribed degree than the original shaping regions.

INDUSTRIAL APPLICABILITY

Thus, since the present invention accomplishes efficient squeegeeing and thus allows efficient shaping of three-dimensional objects to be ensured, it can contribute to a wide range of applications in the technical field of three-dimensional shaping.

REFERENCE SIGNS LIST

1: Inside region
2: Outside region
3: Sintering region or maximum sintering region

What is claimed is:

1. A three-dimensional object shaping method comprising the steps of:
    a powder layer forming step including the steps of:
        supplying a powder to a shaping chamber and
        smoothing the powder by sliding a squeegee on the supplied powder,
    a sintering step including the steps of:
        irradiating the powder layer with one of a light beam and electron beam,
        moving the position of irradiation, and
        successively repeating the steps of irradiating and moving in that order to laminate sintered layers,
    dividing shaping regions into a plurality of laminating units along a height direction by a plural number n divisions, with each laminating unit including prearranged sintering regions,
    establishing a plural number m dividing regions as a plurality of laminating layers along the height direction for each of laminating units,
    using a maximum prearranged sintering region, formed by superimposing all of the prearranged sintering regions, one after another from 1 to the plural number m before sintering in each laminating unit of the plurality of laminating units, as a basis,
    wherein the maximum prearranged sintering region includes all of the prearranged sintering regions in each laminating unit of the plurality of laminating units as a common unit region by superimposing the prearranged sintering regions,
    dividing each laminating unit of the plurality of laminating units into an inside region including the maximum prearranged sintering region, and an outside region not including the maximum prearranged sintering region, and
    setting a squeegee sliding speed in the outside region to be greater than the sliding speed in the inside region one after another from 1 to the plural number n.
2. The three-dimensional object shaping method according to claim 1, further comprising the step of setting each location on an outer periphery of the inside region at a border between the inside region and the outside region to be separated from a respective location on an outer periphery of the maximum prearranged sintering region by a length of a prescribed distance along a line connecting a center location of the maximum prearranged sintering region and each location on the outer periphery.

3. The three-dimensional object shaping method according to claim 1, further comprising the step of setting the maximum prearranged sintering region and the inside region to be equivalent in each of the plurality of laminating units.

* * * * *